D. PULLEN.
LAND ROLLER.
APPLICATION FILED MAR. 31, 1914.

1,113,141.

Patented Oct. 6, 1914.
2 SHEETS—SHEET 1.

Witnesses
H. S. McDowell
K. Peacock

Inventor
David Pullen.
By Victor J. Evans
Attorney

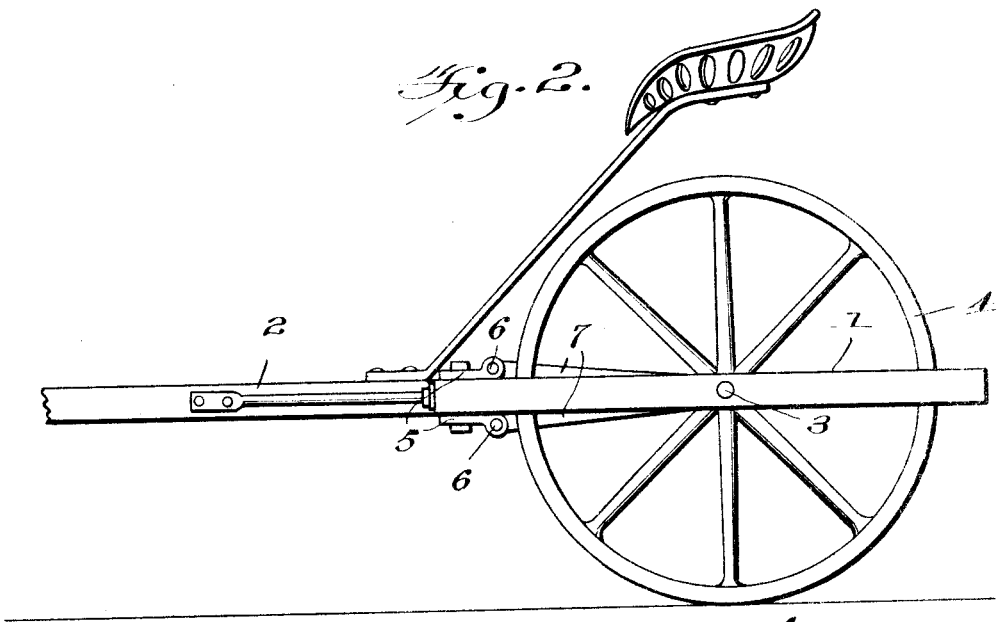
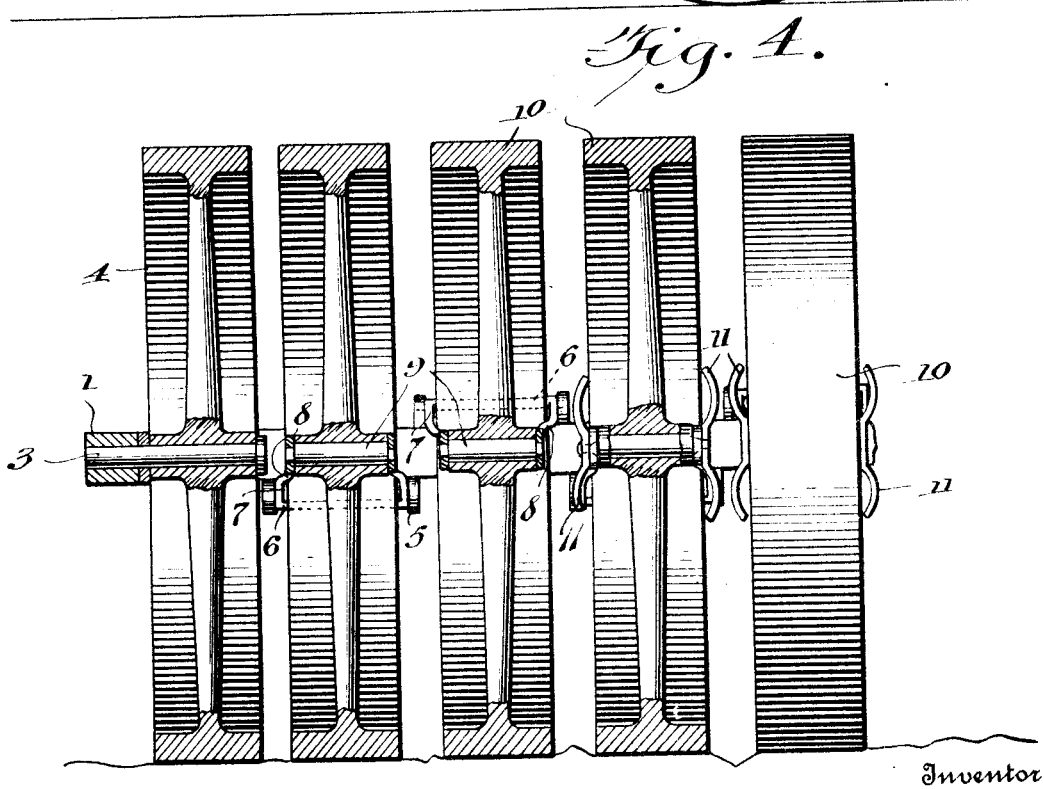

UNITED STATES PATENT OFFICE.

DAVID PULLEN, OF HUDSON, KENTUCKY.

LAND-ROLLER.

1,113,141.  Specification of Letters Patent.  Patented Oct. 6, 1914.

Application filed March 31, 1914. Serial No. 828,560.

*To all whom it may concern:*

Be it known that I, DAVID PULLEN, a citizen of the United States, residing at Hudson, in the county of Breckinridge and State of Kentucky, have invented new and useful Improvements in Land-Rollers, of which the following is a specification.

This invention relates to land rollers and it consists in the novel features hereinafter described and claimed.

An object of the invention is to provide a roller of simple and durable structure which includes a frame having roller sections journaled upon fixed axles provided at the ends of the frame. Between the end roller sections pivoted roller sections are provided and are adapted to move vertically with relation to each other in order that the said sections may effectually roll the surface of the soil and may enter depressions therein or pass over raised portions thereof.

Figure 1:
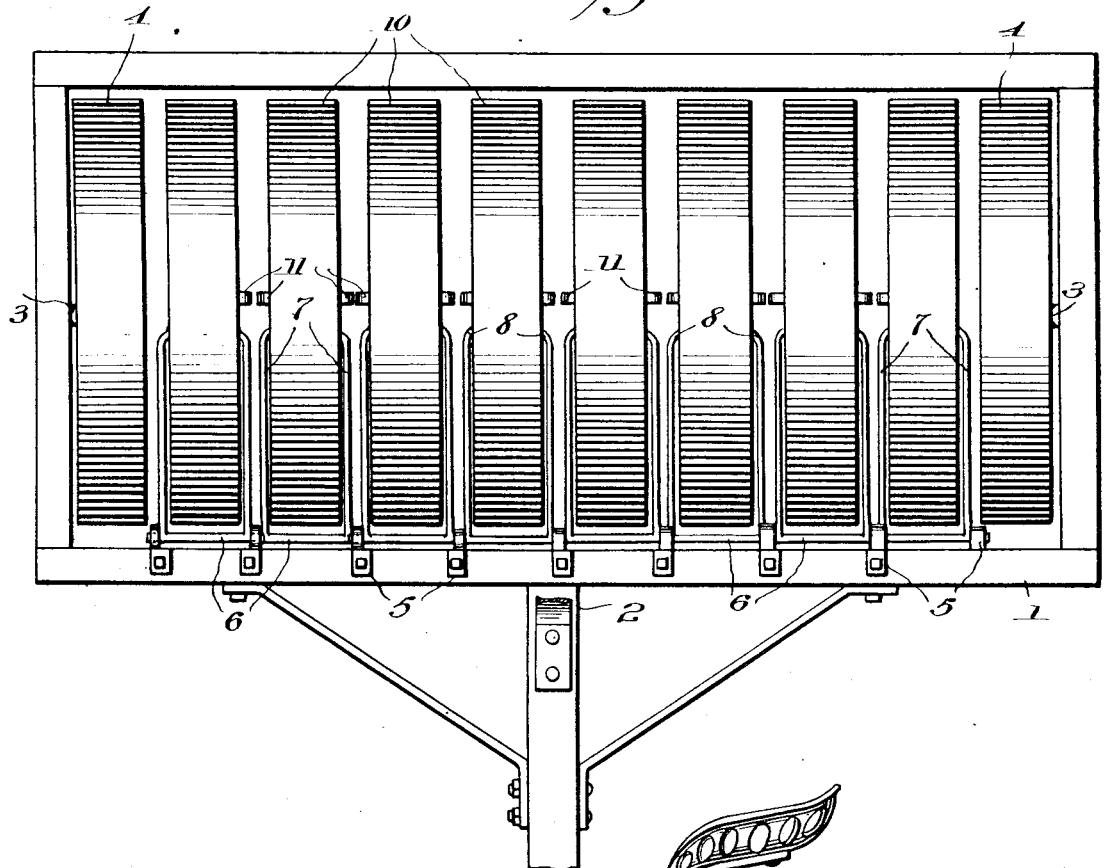
Figure 3:
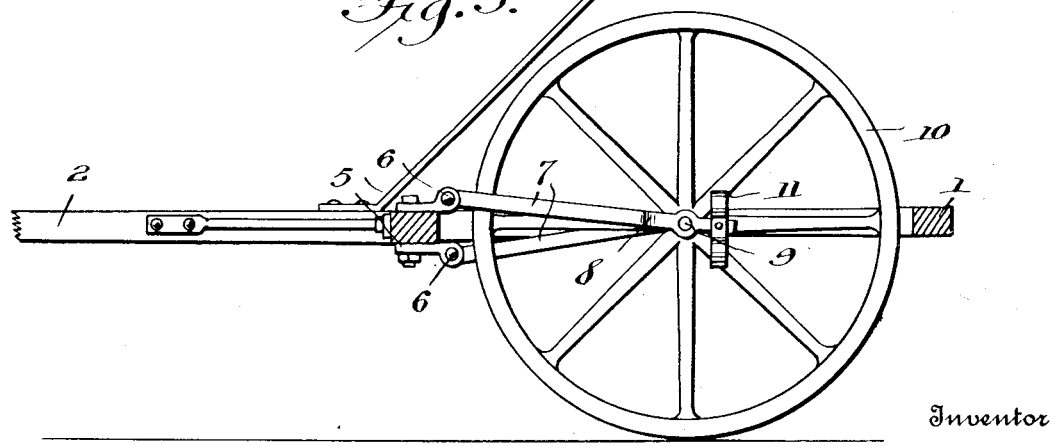

In the accompanying drawing:—Figure 1 is a top plan view of the land roller. Fig. 2 is an end elevation of the same. Fig. 3 is a vertical longitudinal sectional view of the same. Fig. 4 is a detailed sectional view of parts of the same with parts in elevation.

The roller comprises a frame 1 which is preferably rectangular in plan and to which may be connected a draft tongue 2. Axles 3 are fixed at the ends of the frame 1 and roller sections 4 are journaled upon the said axles and are located within the frame.

Bearings 5 are provided upon the front cross bar of the frame 1 and the said bearings are arranged in pairs. Each alternate pair of bearings 5 is located upon the upper side of the said cross bar and the other bearings are located at the under side of the said cross bar. Shafts 6 are journaled in the members of the pairs of bearings 5 and each shaft 6 is provided with a pair of arms 7. The rear ends of the arms 7 are offset as at 8 and are connected together by spindles 9. Roller sections 10 are journaled upon the spindles 9 and the intermediate portions of the arms 7 lie in close proximity to the edges of the said roller sections 10 while the offset ends 8 lie in close proximity to the hub of the said roller sections. Guide strips 11 are fixed to the free end portions of the arms 7 and are disposed transversely of the arms and serve as means for preventing the said arms from interfering with each other when the roller sections 10 move vertically with relation to each other.

From the above description taken in conjunction with the accompanying drawing it will be seen that as the roller is moved over the surface of the soil the intermediate roller sections 10 may move vertically with relation to each other and consequently the said sections may follow uneven places at the surface of the soil and effectually roll the same. The object in having the set of bearings 5 located at the opposite sides of the forward cross bar of the frame 1 is that by so arranging the said bearings the roller sections 10 may be positioned in close proximity with relation to each other.

Having described the invention what is claimed is:—

1. A land roller comprising a frame having at its ends fixed axles, roller sections journaled upon the axles, bearings located on the opposite faces of the forward portion of the frame, shafts journaled in the bearings, arms carried by the shafts and roller sections journaled between the arms and located between the first mentioned roller sections.

2. A land roller comprising a frame having at its ends fixed axles, roller sections journaled upon said axles, arms pivotally connected in the frame and arranged in pairs the rear ends of the said arms having offset extremities, guide strips fixed upon said extremities and disposed transversely of the arms and roller sections journaled between the offset extremities of each pair of arms.

In testimony whereof I affix my signature in presence of two witnesses.

DAVID PULLEN.

Witnesses:
  G. D. JOHNSON,
  JESSE ROBINSON.